(12) United States Patent
Barrick et al.

(10) Patent No.: US 6,578,130 B2
(45) Date of Patent: Jun. 10, 2003

(54) PROGRAMMABLE DATA PREFETCH PACING

(75) Inventors: Brian David Barrick, Pflugerville, TX (US); Michael John Mayfield, Austin, TX (US); Brian Patrick Hanley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 09/981,880

(22) Filed: Oct. 18, 2001

(65) Prior Publication Data

US 2003/0079089 A1 Apr. 24, 2003

(51) Int. Cl.[7] ............................................. G06F 12/00
(52) U.S. Cl. ...................... 711/213; 711/137; 711/204
(58) Field of Search .................................. 711/137, 204, 711/213

(56) References Cited

U.S. PATENT DOCUMENTS

| | | | | |
|---|---|---|---|---|
| 5,758,119 A | * | 5/1998 | Mayfield et al. | 711/122 |
| 6,073,215 A | * | 6/2000 | Snyder | 711/137 |
| 6,412,046 B1 | * | 6/2002 | Sharma et al. | 711/137 |
| 6,421,762 B1 | * | 7/2002 | Arimilli et al. | 711/130 |
| 6,446,167 B1 | * | 9/2002 | Mayfield et al. | 711/122 |
| 6,460,115 B1 | * | 10/2002 | Kahle et al. | 711/122 |

* cited by examiner

Primary Examiner—Reba I. Elmore
(74) Attorney, Agent, or Firm—Carr Law Firm, L.L.P.; Robert M. Carwell

(57) ABSTRACT

A method and apparatus for prefetching data in computer systems that tracks the number of prefetches currently active and compares that number to a preset maximum number of allowable prefetches to determine if additional prefetches should currently be performed. By limiting the number of prefetches being performed at any given time, the use of system resources for prefetching can be controlled, and thus system performance can be optimized.

19 Claims, 3 Drawing Sheets

PROGRAMMABLE DATA PREFETCH PACING

BACKGROUND

The continuing development of computer systems has resulted in efforts to increase performance and maximize efficiency of the computer systems. One solution to this problem has been the creation and utilization of cache systems in a computer. The purpose of a cache system is to bring the speed of accessing computer system memory as close as possible to the speed of the central processing unit (CPU) itself. By making instructions and data available to the CPU at a rapid rate, it is possible to increase the performance rate of the processor. A cache system has access time that approaches that of CPU components, and is often 5 to 10 times faster than the access time of main memory components. When the CPU makes a data request, the data can be found in one of the processor caches, main memory, or in a physical storage system (such as a hard disk). Each level consists of progressively slower components. There are usually several levels of cache. The L1 cache, which usually exists on the CPU, is the smallest in size. The larger L2 cache (second-level cache) may also be on the CPU or be implemented off the CPU with SRAM. main memory is much larger and consists of DRAM, and the physical storage system is much larger again but is also much, much slower than the other storage areas. Cache memories are fast memory storage devices. A cache system increases the performance of a computer system by predicting what data will be requested next and having that data already stored in the cache, thus speeding execution. The data search begins in the L1 cache, then moves out to the L2 cache, then to DRAM, and then to physical storage.

A process known as "prefetching" is known in the art. Prefetching is used to supply memory data to CPU caches ahead of time to reduce microprocessor access time. By fetching data from a slower storage system and placing it in a faster access location, such as the L1 or L2 cache, the data can be retrieved more quickly. Ideally, a system would prefetch the data and instructions that will be needed next far enough in advance that a copy of the data that will be needed by the CPU would always be in the L1 cache when the CPU needed it. However, prefetching involves a speculative retrieval of data that is anticipated to be needed by the microprocessor in subsequent cycles. Data prefetch mechanisms can be software controlled by means of software instructions, or hardware controlled, using pattern detection hardware. Each of these prefetch mechanisms has certain limitations.

Software prefetch mechanisms typically use instructions such as Data Stream Touch (DST) to prefetch a block of data. Once the prefetch is started by the software command, hardware is used to prefetch the entire block of data into the cache. If the block of data fetched is large relative to the size of the L1 cache, it is probable that data currently being used by the CPU will be displaced from the L1 cache. The needed displaced lines will have to be refetched by the CPU, resulting in a slower performance. In addition, software prefetch instructions may be used to generate access patterns which do not efficiently use caches when prefetching larger lines, such as 128 bytes. For example, a DST instruction can specify a starting address, a block size (1 to 32 vectors, where a vector is 16 bytes), a number of blocks to prefetch (1 to 256 blocks), and a signed stride in bytes (−32768 to +32768). An access pattern which specifies blocks which span cache lines and are irregularly spaced, relative to the cache lines, will waste cache space. And, due to the sparse use of the data in the cache line, performance will be lowered. Additionally, large amounts of hardware may required to implement the full scope of the software prefetch instruction.

Hardware mechanisms prefetch a stream of data and generally only prefetch as far ahead as the cache and memories require. Because hardware mechanisms detect a stream, the stream logic has to generate enough prefetched to get the designated number of lines ahead of the actual processor accesses. Once the hardware is far enough ahead, the lines are prefetched at the rate at which the processor consumes them. Often, however, especially when a hardware prefetch is first started, several prefetches may be active at once in order to get enough lines ahead of the actual processor accesses. Prefetching of several streams at once can slow processor speed in general, which can slow access to needed data and processing of that data. These problems are increased in a systems that prefetches data from a plurality of L1 and L2 caches, as is becoming more common in larger, faster systems having multiple processors.

With either software or hardware prefetch mechanisms, there is always a performance trade off between utilizing cache resources for the prefetches versus CPU intruction or data requests. Therefore, what is needed is a system and method of efficiently utilizing prefetch logic so as to maximize CPU performance.

SUMMARY

The present invention, accordingly, provides a method and apparatus for controlling utilization of resources in a system for prefetching. By controlling the amount of L2 resources which can be used by prefetch accesses, the amount of CPU resources being used for prefetch requests and responses is kept at a level that does not exceed cache processing and storage abilities.

A method of the present invention involves prefetching data in a data processing system comprising a plurality of L1 caches and a plurality of L2 caches to control utilization of resources. The method comprises defining a maximum number of allowable L2 cache prefetches, and monitoring the actual number of L2 cache prefetches. When the system receives a request for an L2 cache prefetch, it determines if the current actual number of L2 cache prefetches is less than the defined maximum number of allowable L2 cache prefetches. If the actual number of L2 cache prefetches is less than the maximum number of allowable L2 cache prefetches, the system permits prefetching the requested data to the L2 cache. If the actual number of L2 cache prefetches is equal to the defined maximum number of allowable L2 cache prefetches, the system delays prefetching the requested data to the L2 cache until at least one prefetch already in the cache has been completed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
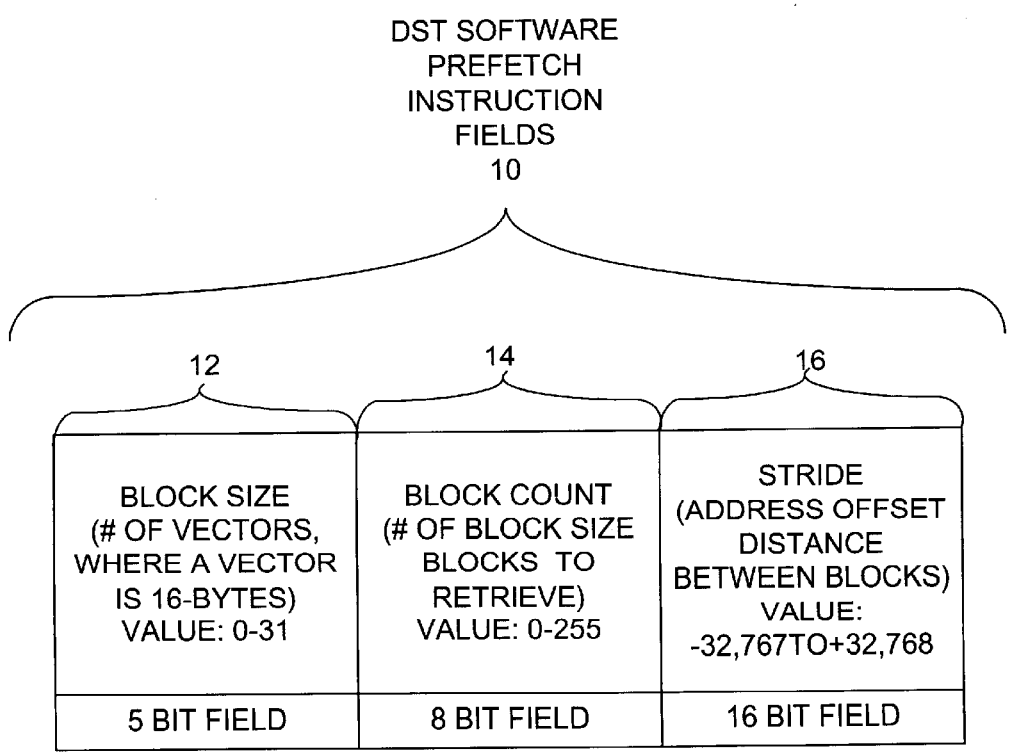
FIG. 1 is a schematic diagram of the fields of a software prefetch instruction.

In the discussion of the FIGURES, the same reference numerals will be used throughout to refer to the same or similar components. In the interest of conciseness, various other components known to the art, such as computer components and the like necessary for the operation of the invention, have not been shown or discussed.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. It is further noted that, unless indicated otherwise, all functions described herein are performed by a processor such as a computer or electronic data processor in accordance with code such as computer program code, software, or integrated circuits that are coded to perform such functions.

In one embodiment of the processor design described, on a VMX platform, the L1 cache level contains logic to support four software prefetch streams, along with four hardware controlled prefetch streams. The processor can also be configured to support eight hardware controlled prefetch streams.

The VMX architecture uses Data Stream Touch (DST) software instructions to control software prefetch mechanisms. The DST instruction specifies a register containing the starting address, and another register containing fields specifying the access pattern. As shown in FIG. 1, the register specifying the access pattern preferably includes a plurality of fields 10, including the fields BLOCK SIZE 12, BLOCK COUNT 14, and STRIDE 16. BLOCK SIZE 12 is the number of vectors (each vector being 16 bytes) to be retrieved per block for each memory block of the data stream being retrieved from memory. BLOCK COUNT 14 is the number of blocks, each of a size equal to BLOCK SIZE 12 that will make up the data stream prefetched by an instruction. STRIDE 16 is the address offset or distance between each block of the data stream, or the amount the previous address is incremented (or decremented) by to obtain the next address.

When configured as eight hardware controlled prefetch streams, each active hardware stream will source data prefetches for the L1 cache, and additional prefetches for the L2 cache. Each of the active hardware stream mechanism will attempt to maintain one prefetch line in the L1 cache and a configurable number of additional prefetched lines in the L2. In the preferred embodiment, the number of additional lines prefetched by each stream into the L2 is set at four.

When configured to support four software prefetch streams, along with four hardware controlled prefetch streams, software prefetch instructions DSTs can be supported. In this embodiment, the DST instructions are mapped into slighty modified versions of the hardware prefetch mechanism. These prefetch mechanisms load the requested block into the L2 cache by sourcing the required number of L2 cache line prefetches. These prefetches, once started by the DST instruction, generate their sequence of L2 cache line prefetches independent of the subsequent CPU instruction stream.

Either prefetch configuration can generate more prefetches than can be handled by the L2 cache level, which, in this implementation, can support a maximum of six load or store requests actively arbitrating for L2 cache accesses, or waiting for L2 cache reload data due to L2 cache misses. As an example, a single DST instruction might be issued that causes a block of twenty cache lines to be loaded into the L2 cache. At the same time, the concurrently executing instruction stream in the processor may also be generating L1 cache misses needing to be serviced by the same six L2 load or store resources.

To maximize system performance, a mechanism is preferably provided to software to control the number of these six L2 resources which can be used by prefetch accesses. This is done by keeping track of the total number of prefetches active at the L2 level and comparing the number active with a maximum value set by software. As long as the number of prefetches active is less than the maximum, the L2 logic will continue to accept prefetches from the prefetch mechanisms. When the limit is reached, the L2 logic no longer accepts prefetches from the prefetch mechanisms, forcing a stall in the acceptance of the prefetching. The maximum setting can be set at initialization time to a value determined to provide the best overall system performance. Alternatively, the value can be set dynamically by software, via a prefetch configuration register, if a better value for certain applications is known.

Figure 2:
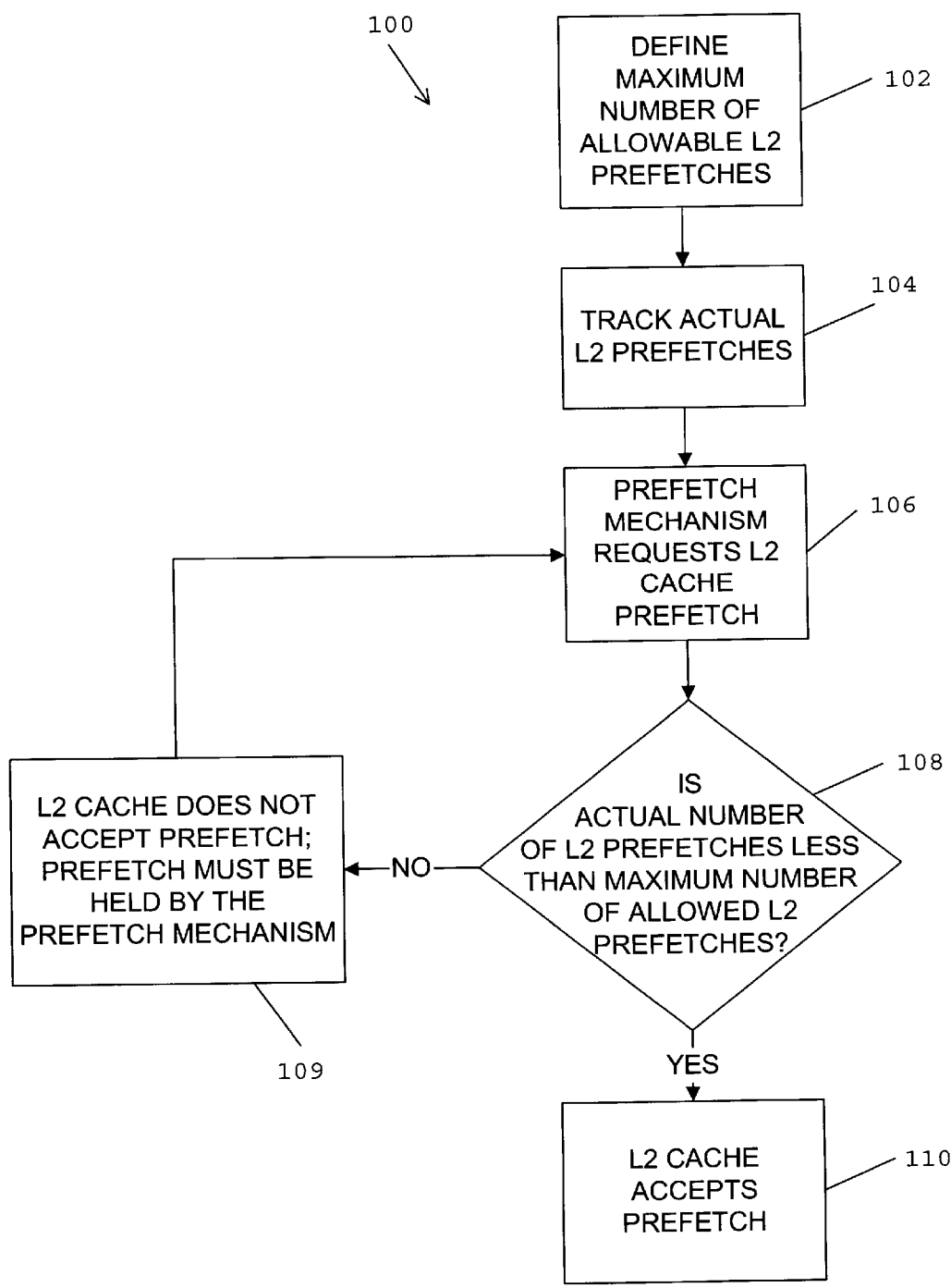
FIG. 2 is a flow chart of a software method for controlling prefetches in the present invention.

FIG. 2 illustrates a flow diagram of the prefetch mechanism 100 of the present invention. The maximum number of allowable L2 prefetches is controlled by a software prefetch configuration register 102. The value of this configuration register can be set either at the initial startup of the system or dynamically while the system is operating. At step 104 the system tracks the actual number of L2 prefetches while the system is operative. When one of the eight hardware or software prefetch mechanisms requests an L2 cache prefetch at step 106, the system makes a determination as to whether the actual number of L2 prefetches is less than the maximum number of allowable L2 prefetches 108. If the actual number of L2 prefetches is equal to the maximum number of allowed L2 prefetches, at step 109 the requesting prefetch is not accepted, forcing the prefetch request to be held until an L2 prefetch resource becomes available. If at step 108 the actual number of L2 prefetches is less than the maximum number of allowed L2 prefetches, then the system allows the L2 cache to prefetch the data requested by the prefetch mechanism at step 110.

Figure 3:
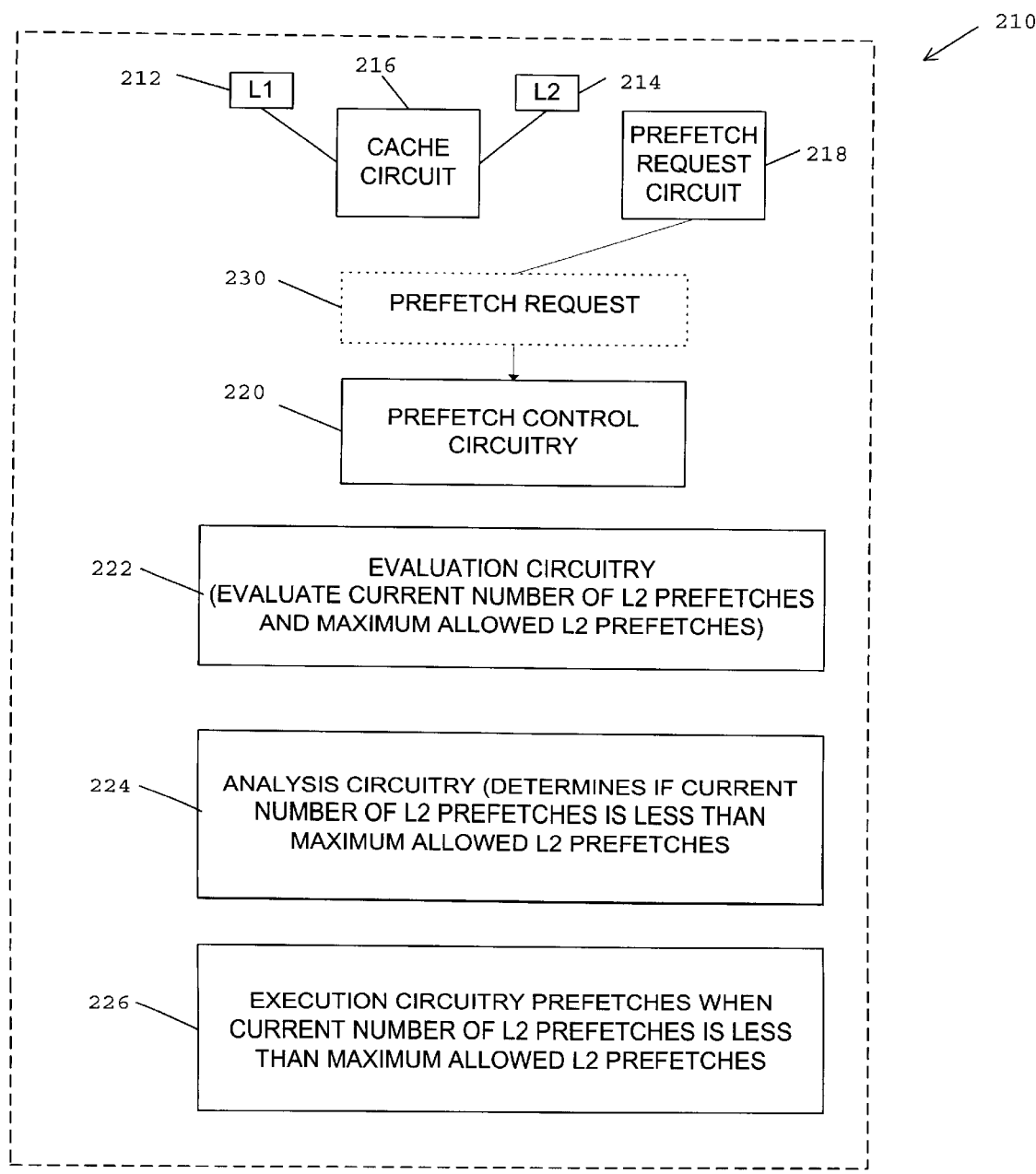
FIG. 3 depicts, in block diagram form, a preferred sequence of events which transpire in the microprocessor of the present invention.

FIG. 3 depicts a microprocessor 210 that forms the central portion of a system used for processing information in accordance with a preferred embodiment of the present invention. In the depicted embodiment, the microprocessor 210 comprises a variety of execution units, registers, buffers, memories and other units, which are all formed by integrated circuitry, that are used to perform the functions of the system. The microprocessor 210 comprises at least one L1 cache 212 and at least one L2 cache 214. The caches are controlled by a cache circuit 216. The microprocessor 310 also comprises a prefetch request mechanism 218 which is used to request data to be prefetched into the cache. When the prefetch request mechanism 218 issues a request to prefetch data, the prefetch control circuitry 220 receives the request from the prefetch request mechanism 218 and relays that request to the evaluation circuitry 222. The evaluation circuitry 222 determines the maximum number of allowed L2 cache prefetches and determines the current number of L2 prefetches already stored in the L2 cache. Analysis circuitry 224 analyzes the data obtained by the evaluation circuitry 222 and determines if the current number of L2 prefetches is less than the maximum allowed L2 prefetches. The analysis circuitry 224, upon determination that the maximum number of allowed L2 cache prefetches has already been performed, delays any additional prefetches to the L2 cache. If the analysis circuitry 224 determines that the current number of L2 prefetches is less than the maximum number of allowed L2 prefetches, it sends a message to the execution circuitry 226 with that information. Upon receipt of such notice from the analysis circuitry 224 the execution circuitry 226 will prefetch data and store it in the proper L2 cache.

It is understood that the present invention can take many forms and embodiments. Accordingly, several variations may be made in the foregoing without departing from the spirit or the scope of the invention. For example, any prefetch mechanism embodiment that can overrun lower level cache resources could use this technique.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for prefetching data in a data processing system comprising a plurality of L1 caches and a plurality of L2 caches to control utilization of resources, the method comprising:
    a) defining a maximum number of allowable L2 cache prefetches;
    b) monitoring the actual number of L2 cache prefetches;
    c) receiving a request for an L2 cache prefetch;
    d) in response to said request, determining if the current actual number of L2 cache prefetches is less than the defined maximum number of allowable L2 cache prefetches;
    e) if the actual number of L2 cache prefetches is equal to the defined maximum number of allowable L2 cache prefetches, delaying the L2 cache from prefetching the data requested; and
    f) if the actual number of L2 cache prefetches is less than the maximum number of allowable L2 cache prefetches, permitting the L2 cache to prefetch the data requested.

2. The method of claim 1 wherein when the actual number of L2 cache prefetches is equal to the defined maximum number of allowable L2 cache prefetches, delaying additional L2 cache prefetches until at least one of the permitted L2 cache prefetches is completed.

3. The method of claim 1 wherein when the actual number of L2 cache prefetches is less than the number of allowable L2 cache prefetches, further allowing the L2 cache to continue accepting prefetch requests.

4. The method of claim 1 further comprising defining a maximum number of allowable L2 cache prefetches at initialization of the data processing system.

5. The method of claim 1 further comprising defining a maximum number of allowable L2 cache prefetches dynamically.

6. A data processing system comprising:
    a) a plurality of L1 caches for storing data;
    b) a plurality of L2 caches for storing data;
    c) instruction dispatch means for providing a plurality of instructions to the data processing system;
    d) a Data Stream Touch (DST) controller programmable to define a maximum number of allowable L2 cache prefetches;
    e) an instruction processing unit configured for receiving instructions from the instruction dispatch means, and capable of monitoring the actual number of L2 cache prefetches;
    f) the instruction processing unit further being capable of receiving a request for an L2 cache prefetch via the instruction dispatch means, and determining, in response to the request, if the current actual number of L2 cache prefetches is less than the maximum number of allowable L2 cache prefetches defined in the Data Stream Touch (DST) controller;
    g) if the actual number of L2 cache prefetches is equal to the maximum number of allowable L2 cache prefetches specified in the Data Stream Touch (DST) controller, the instruction processing unit delaying the L2 cache from prefetching the data requested; and
    h) if the actual number of L2 cache prefetches is less than the maximum number of allowable L2 cache prefetches specified in the Data Stream Touch (DST) controller, the instruction processing unit permitting the L2 cache to prefetch the data requested.

7. The data processing system of claim 6 wherein when the actual number of L2 cache prefetches is equal to the maximum number of allowable L2 cache prefetches, the Data Stream Touch (DST) controller delays additional L2 cache prefetches until at least one of the permitted L2 prefetches is completed.

8. The data processing system of claim 6 wherein when the actual number of L2 cache prefetches is less than the number of allowable L2 cache prefetches, the Data Stream Touch (DST) controller further allows the L2 cache to continue accepting prefetch requests.

9. The data processing system of claim 6 further comprising means for defining a maximum number of allowable L2 cache prefetches at initialization of the data processing system.

10. The data processing system of claim 6 further comprising means for defining a maximum number of allowable L2 cache prefetches dynamically.

11. A computer program product for prefetching data in a computer system, the computer program product having a medium with a computer program embodied thereon, the computer program comprising:
    a) computer program code for defining a maximum number of L2 cache prefetches allowed;
    b) computer program code for receiving a request to prefetch data to the L2 cache;

c) computer program code for calculating the number of prefetches already stored in the L2 cache;

d) computer program code for comparing the maximum number of allowed L2 cache prefetches to the number of prefetches already stored in the L2 cache to determine if the number of prefetches already stored is less than the maximum number of allowed L2 cache prefetches;

e) computer program code acting responsive to step d) for delaying the L2 cache prefetching data if the maximum number of allowed prefetches is determined to be already stored in the L2 cache; and f) computer program code acting responsive to step D for executing the L2 cache prefetch if the maximum number of allowed prefetches has not yet been achieved.

12. The computer program product of claim 11 further comprising computer program code for delaying the L2 cache from accepting prefetch requests when the actual number of L2 cache prefetches is equal to the maximum number of allowable L2 cache prefetches until at least one accepted L2 cache prefetch is completed.

13. The computer program product of claim 11 further comprising computer program code for allowing the L2 cache to continue accepting prefetch requests when the actual number of L2 cache prefetches is less than the number of allowable L2 cache prefetches.

14. The computer program product of claim 11 further comprising computer program code for defining a maximum number of allowable L2 cache prefetches at initialization of the computer program product.

15. The computer program product of claim 11 further comprising computer program code for defining a maximum number of allowable L2 cache prefetches dynamically.

16. A microprocessor comprising:

a) a cache circuit comprising at least one L1 cache and at least one L2 cache;

b) a circuit configured for issuing a prefetch request wherein the prefetch request specifies a starting address a block size, a number of blocks to prefetch, a signed stride and a stream identifier;

c) prefetch control circuitry configured for receiving the prefetch request;

d) evaluation circuitry configured for determining a maximum number of allowed L2 cache prefetches and a number of prefetches already stored in the L2 cache;

e) circuitry, responsive to the evaluation circuitry configured for determining when the number of prefetches already stored in the L2 cache is equal to the maximum number of allowed L2 cache prefetches and delaying additional prefetches;

f) circuitry, responsive to the evaluation circuitry configured for determining when the number of prefetches are stored in the L2 cache is less than the maximum number of allowed L2 cache prefetches; and g) execution circuitry configured for allowing prefetching when the number of prefetches are stored in the L2 cache is less than the maximum number of allowed L2 cache.

17. A microprocessor according to claim 16 further comprising circuitry configured for delaying the L2 cache from accepting prefetch requests when the actual number of L2 cache prefetches is equal to the maximum number of allowable L2 cache prefetches until at least one accepted L2 cache prefetch is completed.

18. A microprocessor according to claim 16 further comprising circuitry configured for defining the maximum number of allowed L2 cache prefetches at initialization of the microprocessor.

19. A microprocessor according to claim 16 further comprising circuitry configured for defining the maximum number of allowed L2 cache prefetches dynamically.

* * * * *